United States Patent
Hanson et al.

(10) Patent No.: US 10,122,511 B2
(45) Date of Patent: Nov. 6, 2018

(54) AUTOMATIC CONFIGURATION SUB-SYSTEM FOR DISTRIBUTED ANTENNA SYSTEMS

(71) Applicant: CommScope Technologies LLC, Hickory, NC (US)

(72) Inventors: Van E. Hanson, Forest, VA (US); Michael J. Williamson, Clayton, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/679,262

(22) Filed: Aug. 17, 2017

(65) Prior Publication Data

US 2018/0091275 A1    Mar. 29, 2018

Related U.S. Application Data

(60) Division of application No. 14/993,430, filed on Jan. 12, 2016, now Pat. No. 9,742,538, which is a
(Continued)

(51) Int. Cl.
*H04B 7/02*     (2018.01)
*H04L 5/00*    (2006.01)
(Continued)

(52) U.S. Cl.
CPC ......... *H04L 5/0048* (2013.01); *H04B 7/0413* (2013.01); *H04B 17/12* (2015.01);
(Continued)

(58) Field of Classification Search
CPC ... H04L 5/00048; H04B 17/12; H04B 7/0413; H04W 16/02; H04W 16/04; H04W 16/18;
(Continued)

(56) References Cited

U.S. PATENT DOCUMENTS 5,574,466 A    11/1996    Reed et al.
7,480,485 B1    1/2009    Oh et al.
(Continued)

FOREIGN PATENT DOCUMENTS

WO    2009002331    12/2008

OTHER PUBLICATIONS

European Patent Office, "Extended European Search Report from PCT Application No. PCT/US2014015772", "Foreign Counterpart to U.S. Appl. No. 14/383,700", dated Sep. 1, 2016, pp. 1-8, Published in: EP.
(Continued)

*Primary Examiner* — Helene Tayong
(74) *Attorney, Agent, or Firm* — Fogg & Powers LLC

(57) ABSTRACT

Systems and methods for automatically configuring a distributed antenna system are provided. A configuration sub-system of the distributed antenna system can identify signal parameters for downlink signals received from one or more base stations via inputs of a unit in the distributed antenna system. The configuration sub-system can automatically determine a configuration plan for the distributed antenna system based on the automatically identified signal parameters. The configuration plan specifies how to combine subsets of the downlink signals for routing to remote antenna units of the distributed antenna system.

11 Claims, 6 Drawing Sheets

Related U.S. Application Data continuation of application No. 14/383,700, filed as application No. PCT/US2014/015772 on Feb. 11, 2014, now Pat. No. 9,271,158.

(60) Provisional application No. 61/763,282, filed on Feb. 11, 2013.

(51) Int. Cl.

| | | |
|---|---|---|
| *H04W 16/02* | (2009.01) | |
| *H04W 16/20* | (2009.01) | |
| *H04B 7/0413* | (2017.01) | |
| *H04W 16/04* | (2009.01) | |
| *H04W 16/18* | (2009.01) | |
| *H04W 24/02* | (2009.01) | |
| *H04W 52/34* | (2009.01) | |
| *H04B 17/12* | (2015.01) | |
| *H04W 72/04* | (2009.01) | |
| *H04W 28/16* | (2009.01) | |
| *H04W 88/08* | (2009.01) | |
| *H04W 92/20* | (2009.01) | |

(52) U.S. Cl.
CPC .......... *H04L 5/0035* (2013.01); *H04L 5/0094* (2013.01); *H04W 16/02* (2013.01); *H04W 16/04* (2013.01); *H04W 16/18* (2013.01); *H04W 16/20* (2013.01); *H04W 24/02* (2013.01); *H04W 28/16* (2013.01); *H04W 52/34* (2013.01); *H04W 52/346* (2013.01); *H04W 72/042* (2013.01); *H04W 72/0453* (2013.01); *H05K 999/99* (2013.01); *H04W 88/085* (2013.01); *H04W 92/20* (2013.01)

(58) Field of Classification Search
CPC ..... H04W 16/20; H04W 24/02; H04W 28/16; H04W 52/34; H04W 52/346; H04W 72/042; H04W 72/0453; H04W 88/085; H04W 92/20
USPC ......................................... 375/267
See application file for complete search history.

(56) References Cited

U.S. PATENT DOCUMENTS

| | | |
|---|---|---|
| 7,808,946 B2 | 10/2010 | Claussen et al. |
| 7,961,618 B1 | 6/2011 | Prasad et al. |
| 8,010,049 B2* | 8/2011 | Kawasaki ............. H04W 36/06 455/62 |
| 8,396,157 B2 | 3/2013 | Li et al. |
| 8,441,951 B2 | 5/2013 | Kazmi et al. |
| 2003/0114165 A1 | 6/2003 | Mills |
| 2005/0259684 A1 | 11/2005 | Csapo |
| 2006/0205342 A1 | 9/2006 | McKay, Sr. et al. |
| 2008/0056150 A1 | 3/2008 | Kujala |
| 2008/0152030 A1 | 6/2008 | Abramov et al. |
| 2010/0067450 A1 | 3/2010 | Balachandran et al. |
| 2010/0178936 A1 | 7/2010 | Wala et al. |
| 2010/0202356 A1 | 8/2010 | Fischer et al. |
| 2010/0323611 A1 | 12/2010 | Choudhury |
| 2011/0135013 A1 | 6/2011 | Wegener |
| 2011/0201368 A1 | 8/2011 | Faccin et al. |
| 2012/0220333 A1 | 8/2012 | Zhu |
| 2012/0307756 A1 | 12/2012 | Collings et al. |
| 2013/0017863 A1 | 1/2013 | Kummetz et al. |
| 2013/0070816 A1 | 3/2013 | Aoki et al. |
| 2013/0071112 A1 | 3/2013 | Melester et al. |
| 2013/0128832 A1 | 5/2013 | Kang et al. |
| 2013/0142054 A1 | 6/2013 | Ahmadi |
| 2013/0195467 A1 | 8/2013 | Schmid et al. |
| 2015/0270882 A1 | 9/2015 | Shattil |

OTHER PUBLICATIONS

United States Patent and Trademark Office, "Notice of Allowance", "From U.S. Appl. No. 14/383,700", dated Nov. 9, 2015, pp. 1-10, Published in: US.

United States Patent and Trademark Office, "Office Action", "From U.S. Appl. No. 14/383,700", dated May 9, 2015, pp. 1-6, Published in: US.

United States Patent and Trademark Office, "Final Office Action", "From U.S. Appl. No. 14/993,430", dated Feb. 8, 2017, pp. 1-20, Published in: US.

United States Patent and Trademark Office, "Notice of Allowance", "From U.S. Appl. No. 14/993,430", dated Apr. 27, 2017, pp. 1-13, Published in: US.

United States Patent and Trademark Office, "Office Action", "From U.S. Appl. No. 14/993,430", dated Jul. 29, 2016, pp. 1-11, Published in: US.

European Patent Office, "Communication to Article 94(3) for EP Application No. 14749211.0", "Foreign Counterpart to U.S. Appl. No. 14/383,700", dated Feb. 28, 2018, pp. 17, Published in: EP.

International Searching Authority, "International Search Report for PCT Application No. PCT/US2014/015772", "Foreign Counterpart to U.S. Appl. No. 14/383,700", dated Jul. 11, 2014, pp. 1-3, Published in: WO.

International Searching Authority, "Written Opinion of the International Searching Authority for PCT Application No. PCT/US2014/015772", "Foreign Counterpart to U.S. Appl. No. 14/383,700", dated Jul. 11, 2014, pp. 1-6, Published in: WO.

* cited by examiner

| Input | Band | Sub-band |
|---|---|---|
| 1 | 201 | 301a |
| 2 | 201 | 301b |
| 3 | 201 | 301b |
| 4 | 201 | 301b |
| 5 | 201 | 301c |
| 6 | 201 | 301d |
| 7 | 202 | 302a |
| 8 | 202 | 302b |
| 9 | 202 | 302c |
| 10 | 203 | 303a |
| 11 | 203 | 303b |

AUTOMATIC CONFIGURATION SUB-SYSTEM FOR DISTRIBUTED ANTENNA SYSTEMS

CROSS-REFERENCE TO RELATED APPLICATIONS

This is a divisional application of U.S. patent application Ser. No. 14/993,430 filed Jan. 12, 2016 and titled "Automatic Configuration Sub-System for Distributed Antenna Systems," which is a continuation application of U.S. patent application Ser. No. 14/383,700 (issued U.S. Pat. No. 9,742, 538) filed Sep. 8, 2014 (issued Aug. 22, 2017) and titled "Automatic Configuration Sub-System for Distributed Antenna Systems," which is a U.S. national phase under 35 U.S.C. 371 of International Patent Application No. PCT/US2014/015772 filed Feb. 11, 2014 and titled "Automatic Configuration Sub-System for Distributed Antenna Systems," which claims the benefit of U.S. Provisional Application Ser. No. 61/763,282 filed Feb. 11, 2013 and titled "Automatic Configuration Sub-System for Distributed Antenna Systems," the contents of each of which are hereby incorporated by reference.

TECHNICAL FIELD

The present disclosure relates generally to telecommunications systems and more particularly (although not necessarily exclusively) to automating the configuration of distributed antenna systems.

BACKGROUND

A distributed antenna system ("DAS") may include master units and remote antenna units. Master units may be connected to base stations. Master units receive downlink signals from base station and distribute downlink signals in analog or digital format to multiple remote antenna units. The remote antenna units transmit downlink signals to mobile communication devices within coverage areas serviced by the remote antenna units. In the uplink direction, signals from mobile communication devices may be received by the remote antenna units. The remote antenna units may combine uplink signals and transmit the combined uplink signals to master units. Master units may transmit uplink signals to the serving base stations.

Signals from many base stations may be communicated via the DAS. The downlink signals may originate from different operators. The downlink signals may be transmitted using different frequency bands and/or different sub-bands within a frequency band. The downlink signals may be combined into various sets for transmission by the remote antenna units. Combining downlink signals may be performed in a manner to accommodate the practical limitations of the various hardware modules and provide the coverage intended by an operator using the DAS. For example, signals in different sub-bands of the same band may be combined together for transmission by a common transmitter.

Configuration of the DAS may involve manually defining which downlink signals are routed to which remote antenna units and defining how downlink signals are combined for retransmission. Signal parameters of the base stations signals may be manually entered for the DAS. Increasing the number of base stations in communication with the DAS or the number of remote antenna units in the DAS may increase the amount of time required for manually configuring the DAS.

SUMMARY

Certain aspects and features of the present invention are directed to automating the configuration of distributed antenna systems.

In one aspect, a configuration sub-system of a distributed antenna system is provided. The configuration sub-system can include a processing device. The processing device can identify signal parameters for downlink signals received from one or more base stations via inputs of a unit in the distributed antenna system. The processing device can automatically determine a configuration plan for the distributed antenna system based on the automatically identified signal parameters. The configuration plan specifies how to combine subsets of the downlink signals for routing to remote antenna units of the distributed antenna system.

In another aspect, a unit of a distributed antenna system is provided. The unit can include an input section and a processing device communicatively coupled to the input section. The input section can receive downlink signals from at one or more base stations. The processing device can identify signal parameters for the received downlink signals. The processing device can automatically determine a configuration plan for the distributed antenna system based on the automatically identified signal parameters. The configuration plan specifies how to combine subsets of the downlink signals for routing to remote antenna units of the distributed antenna system.

In another aspect, a method for configuring a distributed antenna system is provided. The method involves a unit of the distributed antenna system receiving downlink signals from one or more base stations. The method also involves a processing device identifying signal parameters for downlink signals received from one or more base stations via inputs of a unit in the distributed antenna system. The method also involves the processing device automatically determining a configuration plan for the distributed antenna system based on the automatically identified signal parameters. The configuration plan specifies how to combine subsets of the downlink signals for routing to remote antenna units of the distributed antenna system.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
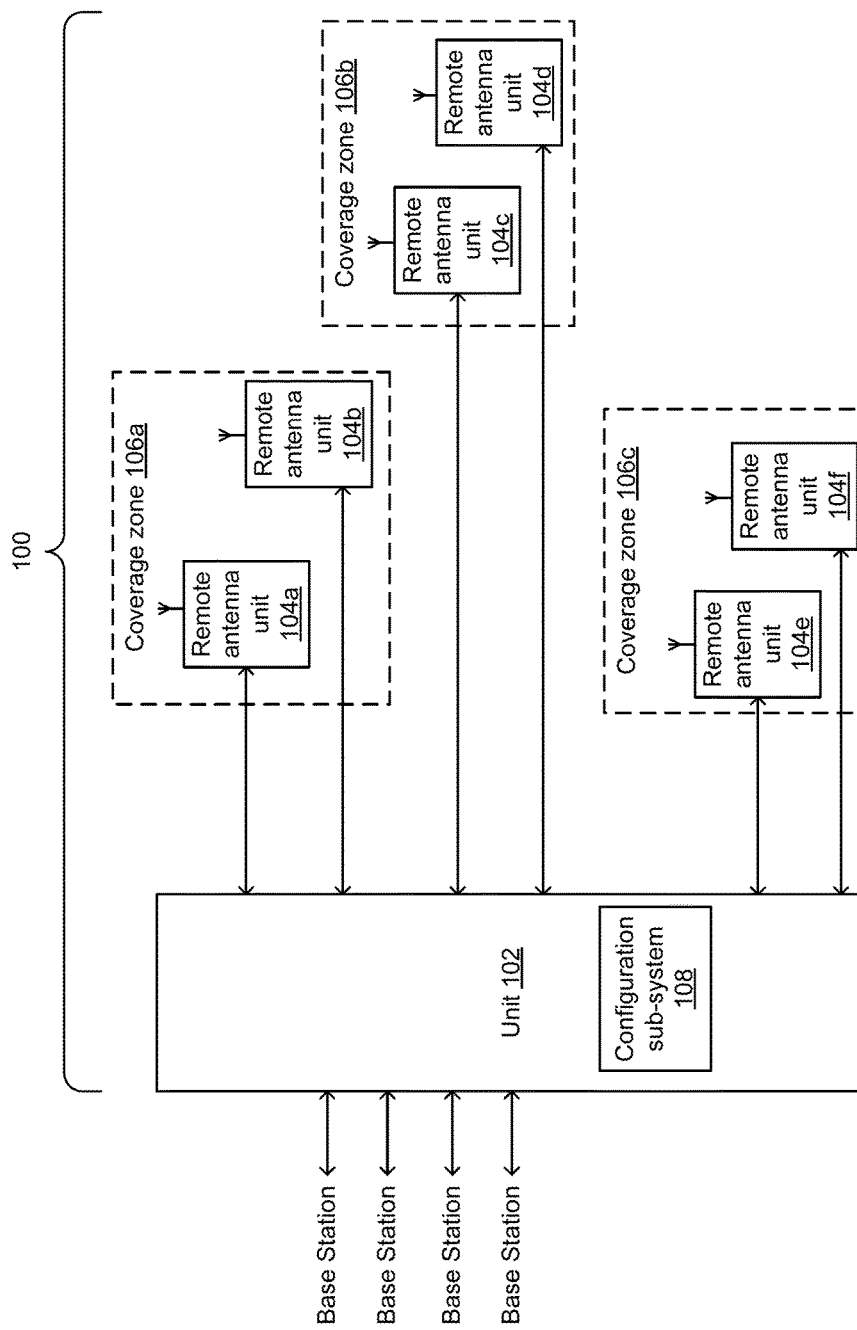
FIG. 1 is a block diagram depicting an example of a distributed antenna system that can include a unit with a configuration sub-system according to one aspect of the present disclosure.

Systems and methods are disclosed for using a configuration sub-system to automatically configure a distributed antenna system ("DAS") or other telecommunication system. The configuration sub-system can automate (either in whole or in part) the routing and combining of signals between base stations in communication with a DAS and remote antennas units in the DAS.

In some aspects, the configuration sub-system of a DAS can include a processing device that can analyze downlink signals received by a master unit or other unit in the DAS from one or more base stations in communication with the DAS. In some aspects, the processing device can be communicatively coupled to a receiver of the master unit and can receive data from the receiver describing the received downlink signals. In other aspects, the processing device can be communicatively coupled to the donor input ports of the master unit via which downlink signals are received, thereby allowing the processing device to directly monitor the downlink signals. The processing device can determine signal parameters of the received downlink signals to determine how different downlink signals may be combined and routed in the DAS. Signal parameters can include characteristics of a signal or groups of signals or other information about a signal or groups of signals. Non-limiting examples of signal parameters include a power spectral density of a received frequency band, the lowest frequency and highest frequency for the frequency band, a center frequency of all channels received by the master unit, bandwidth of all the channels, modulation types for different channels, etc. The processing device can use the signal parameters to generate a configuration plan that specifies which downlink signals from different downlink signals may be combined and which remote antenna units in the DAS are to receive the combined signals from the master unit. In some aspects, the signal parameters of the received signals, including the bandwidth and number of channels, can also be used (separately or in combination) to determine the relative signal levels of base stations signals for signals that are combined into a combined signal. The master unit or other unit can combine downlink signals in accordance with the configuration plan and provide the combined signals to remote antenna units. The remote antenna units can extract downlink signals from the combined signals for transmission in different coverage zones of the DAS.

In additional or alternative aspects, the configuration sub-system can determine whether the same set of frequencies contained within one set of downlink signals is also contained within any other downlink signals (e.g., whether 1920-1940 MHz is detected on one set of downlink signals, whether 1930-1950 MHz is detected on a second set of downlink signals, and whether 1930-1940 MHz is detected on a third set of downlink signals). This information can be used to configure the DAS such that each common set of frequencies is transmitted by a unique, non-overlapping set of remote antenna units. For example, different sectors from the same base station can be routed to different sets of remote antenna units based on the different sets of remote antenna units servicing non-overlapping coverage zones.

In additional or alternative aspects, the configuration sub-system can detect multiple-input and multiple-output ("MIMO") signals. The configuration sub-system can determine which downlink signals (or portions thereof) are part of a MIMO set. This information can be used to configure the DAS to retransmit all MIMO signals that are part of a MIMO set by the corresponding MIMO antennas in a common coverage area.

In additional or alternative aspects, the configuration sub-system can decode data included in the downlink signals that includes additional information about the source or destination of the downlink signals (e.g., a country code or network code identifying an operator using the DAS). The signal parameters and decoded data can be used (separately or in combination) by the configuration sub-system to automatically configure the DAS. Configuring the DAS can include deciding which downlink signals (or portions thereof) are routed to specific remote antenna units and which downlink signals are combined together before being operated on by a common circuit element.

For illustrative purposes, the present disclosure describes a configuration sub-system that can configure a DAS for routing downlink signals. However, other implementations are possible. In additional or alternative aspects, the configuration sub-system can be used to configure how any signals received by a device in the DAS are to be combined and routed to another device in the DAS or a device in communication with the DAS. A suitable configuration process can be performed in the uplink direction such that communication is established between mobile communication devices (or other user equipment in coverage zones) and base stations. For remote antenna units to which the downlink signals are routed, the corresponding uplink signals can be identified by matching paired channels in the uplink band that are used to route uplink signals back to the same base station. The configuration sub-system can use the routing between base stations and the remote antenna units in the downlink direction to determine the routing of uplink signals from remote antenna units to the base stations.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is block diagram depicting an example of a DAS 100 that can include a unit 102 with a configuration sub-system 108. The DAS 100 can include the unit 102 and remote antenna units 104*a-f* in communication with the unit 102. The unit 102 can communicate with one or more base stations or other signal sources, such as repeaters. Different base stations can provide signals associated with different telecommunication operators. The DAS 100 can be positioned in a geographical area (e.g., a stadium, an office building, etc.) to extend wireless communication coverage of the base stations into coverage zones 106a-c of the geographical area.

The DAS 100 or other telecommunications system can include downlink paths for transporting downlink signals from the base stations to one or more of the remote antenna units 104a-f. The DAS 100 can receive downlink signals from the base stations via a wired or wireless communication medium. Downlink signals can include signals provided from the base stations and transmitted by the remote antenna units 104a-f in the coverage zones 106a-c. A non-limiting example of a remote antenna unit is a universal access point.

The DAS 100 or other telecommunications system can also include uplink paths for transporting uplink signals from one or more of the remote antenna units 104a-f to one of more of the base stations or repeaters. Uplink signals are signals at frequencies in an uplink frequency band that are recovered or otherwise received by one or more of the remote antenna units 104a-f from communication devices in the coverage zones 106a-c.

The unit 102 can communicate signals between the base stations and the remote antenna units 104a-f. Non-limiting examples of a unit 102 include a wireless conversion station or other master unit, a base station router, etc. In some aspects, the unit 102 can be directly connected to one or more of the remote antenna units 104a-f, as depicted in FIG. 1. In other aspects, the unit 102 can be connected to one or more extension units that are directly connected to one or more of the remote antenna units 104a-f.

For illustrative purposes, FIG. 1 depicts a single unit 102 in communication with six remote antenna units 104a-f. However, a distributed antenna system 100 can include any number of units in communication with base stations or other signals sources as well as any number of remote antenna units for communicating signals between any number of signal sources and any number of coverage areas.

A DAS 100 can include other devices in addition to master units, remote antenna units, and extension units. For example, in some aspects, the DAS 100 may include a base station router or other interface device that receives signals from base stations and provides the signals to the unit 102.

FIG. 1 also depicts a configuration sub-system 108 that is included in the unit 102. The configuration sub-system 108 can include one or more devices for monitoring and analyzing signals received by the unit 102, determining how the received signals are to be combined and routed, and generating a configuration plan for the DAS 100. The configuration plan can specify how signals received by the unit 102 are to be combined and routed to other devices in the DAS 100 or in communication with the DAS 100.

Figure 2:
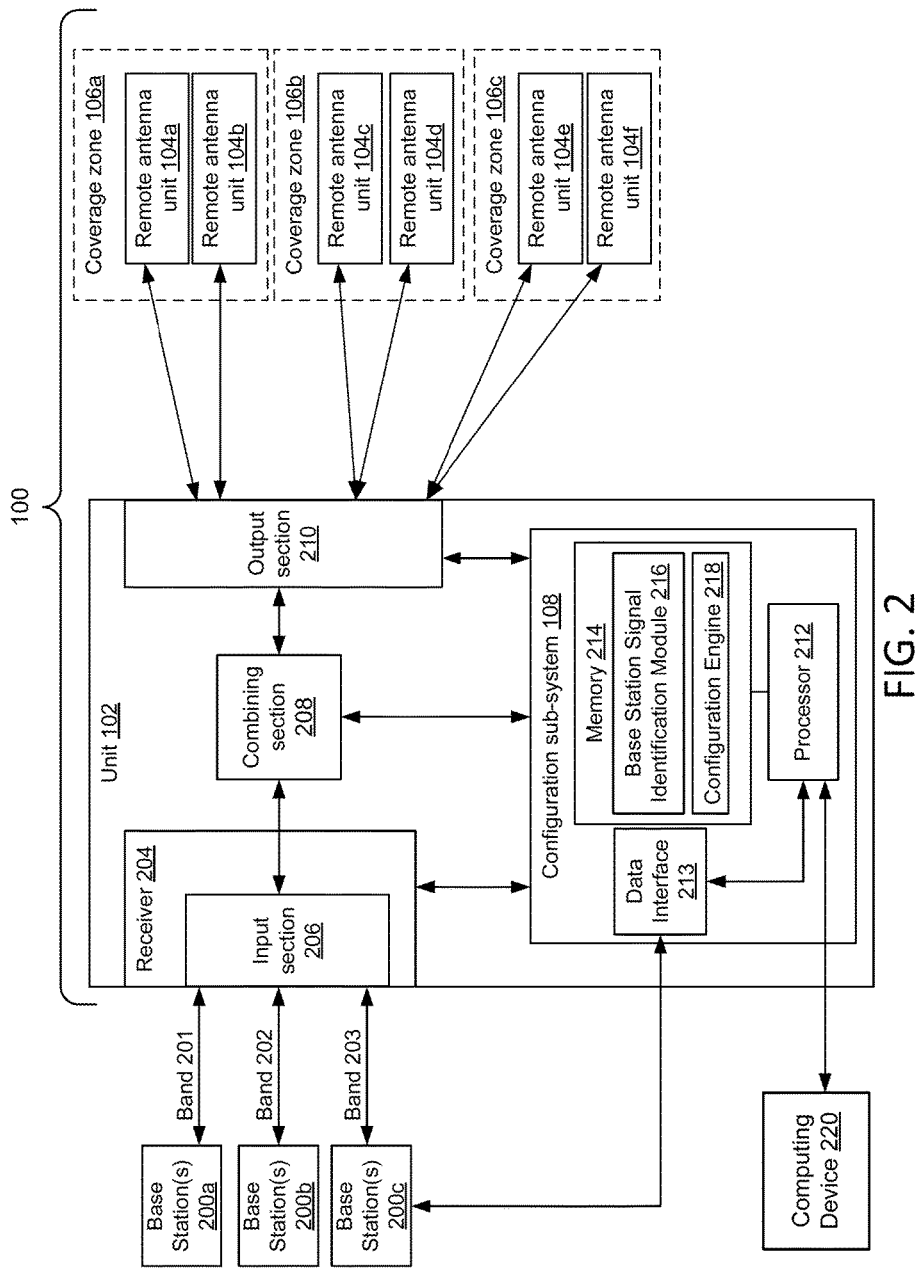
FIG. 2 is a block diagram depicting an example of configuration sub-system that is included in the unit of the distributed antenna system of FIG. 1 according to one aspect of the present disclosure.

FIG. 2 is a block diagram depicting an example of configuration sub-system 108 that is included in a unit 102 of the DAS 100. The configuration sub-system 108 can communicate with other devices in the unit 102. For example, FIG. 2 depicts a configuration sub-system 108 in communication with devices of the unit 102 such as a receiver 204 having an input section 206, a combining section 208, and an output section 210.

The input section 206 of the unit 102 can include multiple input ports for receiving downlink signals from base stations. The input section 206 can also include one or more components for communicatively coupling the input ports to the configuration sub-system 108. A non-limiting example of a component for communicatively coupling the input ports to the configuration sub-system 108 is a switch matrix. The received downlink signals can be transmitted from the base stations to the unit 102 using different frequency bands, such as the frequency bands 201, 202, 203 depicted in FIG. 2. In some aspects, the unit 102 can transmit uplink signals having frequencies in the frequency bands 201-203 to the base stations. In other aspects, the master unit can transmit uplink signals having frequencies other than the frequency bands 201-203 to the base stations.

The combining section 208 can combine signals from different base stations for routing to the remote antenna units 104a-f servicing the coverage zones 106a-c. A non-limiting example of a combining section 208 includes one or more adders or other combiners. The configuration sub-system 108 can be used to configure one or more of the receiver 204 and the combining section 208 to control which downlink signals are combined together for transmission to different remote antenna units. In one non-limiting example, the configuration sub-system 108 can communicate control signals to the receiver 204 that configure a switch matrix in the receiver 204 to route different subsets of the received downlink signals to different combining devices in the combining section 208. In another non-limiting example, the configuration sub-system 108 can communicate control signals to the combining section 208 that configure the combining section 208 to combine different sets of downlink signals received from the receiver 204. In another non-limiting example, the configuration sub-system 108 can output a configuration plan to a computing device 220 that describes how to route different downlink signals to different combining devices. The outputted configuration plan can be used by a control device configure the unit 102 for routing downlink signals from the receiver 204 to different combining devices in the combining section 208.

The output section 210 can include one or more components for routing downlink signals from the combining section 208 to the remote antenna units 104a-f. Non-limiting examples of an output section 210 include a switch matrix, a multiplexer, and the like. The configuration sub-system 108 can be used to configure the output section 210 to control which combined downlink signals are routed to different remote antenna units. In one non-limiting example, the configuration sub-system 108 can communicate control signals to the output section 210 that configure a switch matrix in the output section 210 to route different combined downlink signals to different remote antenna units. In another non-limiting example, the configuration sub-system 108 can output a configuration plan to a computing device 220 that describes the routing of different combined downlink signals to various remote antenna units. The outputted configuration plan can be used by a control device in the DAS 100 to configure the unit 102 for routing combined downlink signals to remote antenna units.

The configuration sub-system 108 can include a processing device 212 (or group of processing devices) that includes or is communicatively coupled with a memory device 214. The memory device 214 can be a non-transitory computer-readable medium for storing program instructions that are executable by the processing device 212. The executable program instructions can include a base station signal identification module ("BSSIM") 216 and a configuration engine 218. Although the BSSIM 216 and the configuration engine 218 are depicted in FIG. 2 and described herein as separate logical modules for ease of reference, other implementations are possible. In additional or alternative aspects, the configuration engine 218 and the BSSIM 216 can be implemented via a common software module.

The configuration sub-system 108 can be communicatively coupled to the receiver 204 and can thereby receive data about the downlink signals received via the input section 206. In some aspects, the receiver 204 can transmit data about the received downlink signals to the configuration sub-system 108. In other aspects, the configuration sub-system 108 can be directly coupled to each of the input ports of the input section 206 (e.g., via the leads of a printed circuit board).

The BSSIM 216 can determine information about downlink signals received via the input section 206. For example, the processing device 212 can transmit one or more instructions to the receiver 204 that cause the receiver 204 to be tuned to different frequency bands in which downlink signals can be received. For a given frequency band, the BSSIM 216 can access data that is stored in the memory device 214 and that describes the types of signals transmitted using the frequency band. For example, such data may indicate that the frequency band is used to transmit signals according to the Global System for Mobile Communications ("GSM") standard, the Long Term Evolution ("LTE") standard, etc. For a given frequency band, the BSSIM 216 can execute a search algorithm to identify signals having certain characteristics, such as downlink signals with signal powers exceeding a given threshold. The configuration sub-system 108 can repeat this process to identify downlink signals in each frequency band used by the DAS 100.

The BSSIM 216 can determine information regarding signal parameters of the downlink signals. The signal parameters can include parameters such as frequency bands of operation, frequency occupancy (i.e., difference between minimum frequency and maximum frequency at which downlink signals are transmitted), a center frequency of all channels, modulation types for the downlink signals, signal powers for downlink signals in various frequency channels, etc. The BSSIM 216 can also identify characteristics of the downlink signals such as communication standards used to transmit the downlink signals (e.g. GSM, LTE, Universal Mobile Telecommunications System ("UMTS"), code division multiple access ("CDMA"), Enhanced Voice-Data Optimized ("EV-DO"), etc.). The BSSIM 216 can also identify information elements encoded in the downlink signals, such as (but not limited to) country codes, network codes, base station ID numbers and other identification and operational data that is useful for determining how to configure the DAS 100. In some aspects, the BSSIM 216 can decode MIMO signals received on different input ports to determine which individual MIMO signals are included in a given set of MIMO signals.

In additional or alternative aspects, the configuration sub-system 108 can include a direct data interface from the DAS 100 to one or more of base stations to obtain additional data about the signal parameters of the downlink signals. The configuration sub-system 108 can communicate with the base stations via the direct data interface to obtain data regarding one or more signal parameters of the downlink signals. In one non-limiting example, the direct data interface can include a base station sending control signals to the configuration sub-system 108 via a downlink path. For example, the configuration sub-system 108 depicted in FIG. 2 may receive control signals via downlink paths from the base stations 200a, 200b that provide information about downlink signals from the base stations 200a, 200b. In another non-limiting example, the direct data interface can include a base station sending control signals to the configuration sub-system 108 via a dedicated communication channel separate from the downlink path. For example, the configuration sub-system 108 depicted in FIG. 2 includes a data interface device 213 that communicatively couples the configuration sub-system 108 to the base station 200c. The configuration sub-system 108 can receive control signals via the data interface device 213 that provide information about downlink signals from the base station 200c. In some aspects, the configuration sub-system 108 can use a combination of signal analysis and data obtained via the direct data interface to determine the signal parameters. For example, the configuration sub-system 108 determine signal parameters of some downlink signals by communicating with the base stations via the direct data interface and can determine signal parameters of other downlink signals by analyzing the downlink signals as described above. In other aspects, the configuration sub-system 108 can determine signal parameters solely by communicating with base stations via the direct data interface.

The configuration engine 218 can perform one or more functions for generating a configuration plan for the DAS 100. The configuration engine 218 can use information about the received downlink signals to determine which downlink signals from which base stations are to be routed to which remote antenna units 104a-f. The configuration engine 218 can also use information about the received downlink signals to determine which signals from different base stations can be combined together for processing. For example, the configuration engine 218 can execute a decoding algorithm to decode signals identified by the BSSIM 216 in different frequency bands used by the DAS 100. In some aspects, the configuration engine 218 can determine information about the decoded signals that is communicated to other devices in the unit 102 (e.g., the receiver 204, the combining section 208, the output section 210) in order to configure the DAS 100. In additional or alternative aspects, the configuration engine 218 can determine information about the decoded signals that is communicated to a system controller used to configure the DAS 100. The configuration engine 218 can thus reduce or eliminate the need to manually enter information about downlink signals.

For signals within a frequency band, the configuration engine 218 can determine whether multiple sectors are present for any subset of the band. Each sector can use a set of frequencies that are in common with one or more additional sectors. A sector can include one or more telecommunication channels to be radiated to mobile devices in coverage zones or otherwise distributed to the coverage zones, thereby providing telecommunication capacity in the coverage zones. The sector can be distributed without further subdivision. The configuration engine 218 can determine the number of sectors by determining if any of the downlink signals occupy the same frequencies or blocks of frequencies. Each sector can be transmitted in spatially separate areas to reduce or minimize co-channel interference with one another. For example, the configuration engine 218 can assign a first sector to a first subset of remote antenna units servicing a first coverage zone and assign a second sector to a second subset of remote antenna units servicing a second coverage zone. The assignment of the first and second sectors to the first and second subsets of remote antenna units can be performed based on an absence of overlap between the first and second coverage zones.

In some aspects, the configuration sub-system 108 can automatically configure the DAS 100 using the frequency band(s) of operation, the frequency occupancy for each channel, and the power of each channel. In other aspects, for a more complex DAS 100, the configuration sub-system 108 can automatically configure the DAS 100 using the frequency bands of operation, the frequency occupancy for each channel, the power of each channel, and information describing sectors received by the unit 102 from base stations via a direct data interface.

Although FIGS. 1-2 depict the configuration sub-system 108 as part of the unit 102, other implementations are possible. For example, the configuration sub-system 108 (including one or both of the BSSIM 216 and the configuration engine 218) can be included in any suitable signal analysis device that is configured to process RF signals at frequencies used by the DAS 100. A non-limiting example of a suitable signal analysis device is a digital signal processer that can analyze a digitized signal and determine information about the signal. In some aspects, the functions of the BSSIM 216 or the configuration engine 218 can be performed by one or more devices in the DAS 100 that provide other signal processing functions.

The configuration engine 218 can be used to configure the DAS 100 by determining which downlink signals are to be routed to which of the remote antenna units 104*a-f*. In a DAS 100, different downlink signals may be transmitted to different remote antenna units or groups of remote antenna units for retransmission to mobile communication devices or other user equipment in the coverage zones 106*a-c*. In some aspects, multiple sectors from a base station may be transmitted using the DAS 100. Transmitting multiple sectors from the base station using a DAS 100 can involve transmitting different downlink signals (i.e., signals directed to different end user devices) that occupy the same frequency spectrum. The different downlink signals occupying the same frequency spectrum can be transmitted in spatially distinct coverage areas to reduce or prevent interference with one another. The configuration engine 218 can detect that downlink signals received from a base station via a first input of the unit 102 occupy the same frequency spectrum as downlink signals received via a second input of the unit 102. The configuration engine 218 can determine that the downlink signals received via the two inputs are not to be combined. The configuration engine 218 can determine that the downlink signals received via the two inputs are to be routed to two different sets of remote antenna units servicing spatially distinct coverage areas (i.e., non-intersecting subsets of the remote antenna units 104*a-f*). The configuration engine 218 can determine the routing of downlink signals via any suitable algorithm for determining how to assign different downlink signals occupying the same frequency spectrum to different remote antenna units.

In additional or alternative aspects, the configuration sub-system 108 can generate a graphical interface to be provided to a user for configuring the DAS 100. For example, the processing device 212 of the configuration sub-system 108 can be communicatively coupled to a computing device 220 external to the DAS 100 (e.g., a computing device 220 used by a technician in configuring the DAS 100). The configuration sub-system 108 can generate and provide the graphical interface to the computing device 220. The configuration sub-system 108 can provide a prompt to the user via the graphical interface that solicits authorization to automatically configure the DAS 100. The user can provide input to the configuration sub-system 108 via the computing device 220 that commands the configuration sub-system 108 to automatically configure the DAS 100. In some aspects, the configuration sub-system 108 can generate a configuration recommendation and include the configuration recommendation in the graphical interface provided to the computing device 220. A user of the computing device 220 can manually modify the configuration recommendation, reject the configuration recommendation, instruct the configuration sub-system 108 to execute the configuration recommendation, etc.

In some aspects, a configuration recommendation may identify conflicts or other errors in the routing of signals in the DAS 100. The configuration sub-system 108 can inform a user of the identified conflicts. The configuration sub-system 108 can provide recommendations for resolving the conflicts and/or solicit input from a user for how to resolve the conflicts. One example of a conflict or other error involves multiple sectors with overlapping frequencies being transmitted from a base station via the DAS 100. Another example of a conflict or other error involves signals from one or more operators not being assigned to any remote antenna unit for transmission in one of the coverage areas. Another example of a conflict or other error involves the number of remote antenna units being used to transmit a sector being substantially different that the average number of remotes used to transmit a sector. For instance, the configuration sub-system 108 may determine that for each sector is being transmitted by 8-12 remote antenna units except for one sector that is being transmitted by two remote antenna units. The relatively low number of remote antenna units being used to transmit the sector may indicate an error.

The configuration sub-system 108 can execute a configuration algorithm at any suitable point during deployment, configuration, or operation of the DAS 100. For example, the configuration sub-system 108 can execute a configuration algorithm in response to a new base station being connected to the DAS 100 or in response to any other change in base station connectivity. For instance, during a first time period, the DAS 100 may transmit two sectors, each of which is transmitted by 15 remote antennas. During a second time period, a new base station may be connected to the DAS 100, thereby adding a new sector to be transmitted by the DAS 100. The signals transmitted by the new base station can be detected. The BSSIM 216 can determine that the detected signals are associated with a newly added sector. The configuration engine 218 can reassign sectors among the remote antenna units such that sectors from each base station are transmitted by 10 remote antenna units. In some aspects, the configuration sub-system 108 can continuously monitor the DAS 100 to determine whether there are any system changes that may require a configuration change in the DAS 100. The configuration sub-system 108 can output a notification to the computing device 220 regarding the change and solicit input authorizing a reconfiguration of the DAS 100.

Figures 3, 4:
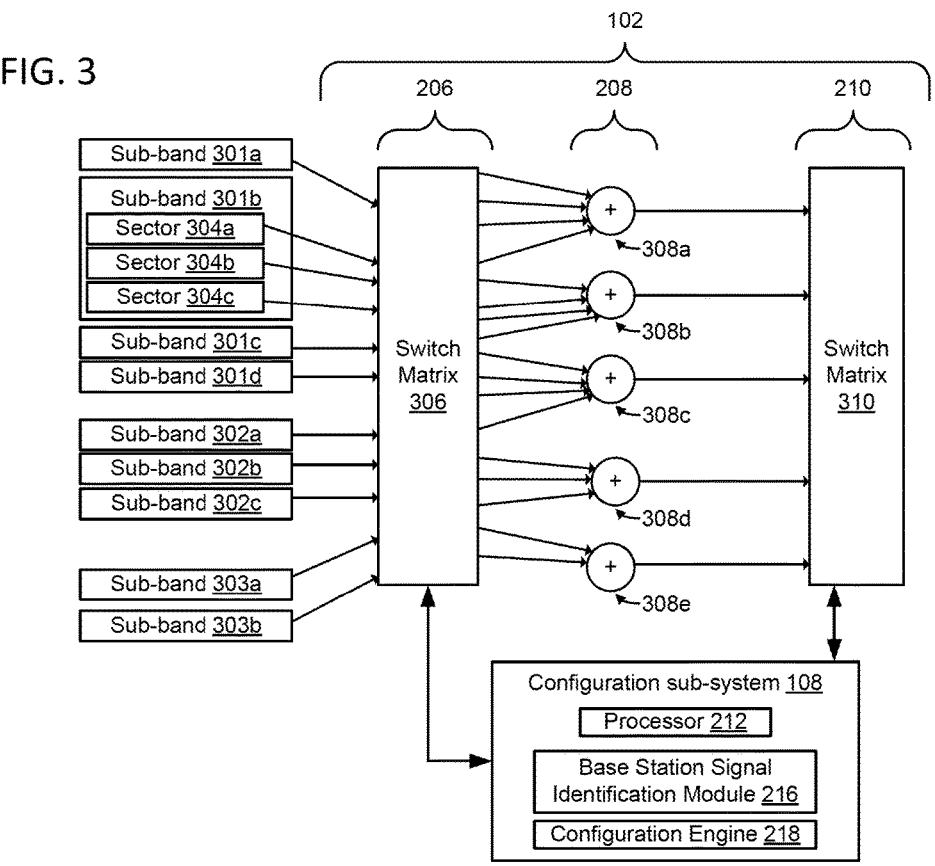
FIG. 3 is a block diagram depicting the unit of FIG. 2 receiving downlink signals having frequencies in different sub-bands that can be combined using the configuration sub-system according to one aspect of the present disclosure.
FIG. 4 is a table depicting frequency bands and sub-bands for signals that may be received by different input ports of the unit of FIG. 3 according to one aspect of the present disclosure.

FIG. 3 is a block diagram depicting the unit 102 receiving downlink signals with frequencies in different sub-bands 301*a-d*, 302*a-c*, 303*a-b* that can be combined when using the configuration sub-system 108 to configure the DAS 100. The input section 206 depicted in FIG. 3 includes a switch matrix 306. In some aspects, the switch matrix 306 can include one or more analog-to-digital converters for converting analog downlink signals into digital downlink signals. The combining section 208 depicted in FIG. 3 includes a group of adders 308*a-e*. In some aspects, the adders 308*a-e* can be replaced with or augmented by other suitable combining devices. The output section 210 depicted in FIG. 3 includes a switch matrix 310.

The configuration sub-system 108 can communicate with the switch matrix 306. The switch matrix 306 is configured to receive downlink signals via donor inputs of the unit 102. The processing device 212 executing the configuration engine 218 can cause the receiver 204 of the unit 102 to be tuned to possible frequency bands used by the DAS 100. In some aspects, the processing device 212 can be communicatively coupled to the input ports of the switch matrix 306 and can directly measure the signal power of downlink signals received via the switch matrix 306. For a unit 102 receiving analog signals via the input section 206, the configuration sub-system 108 may include one or more analog-to-digital converters between the input ports and the processing device 212. In other aspects, the processing device 212 can receive data from the switch matrix 306 or another component of the receiver 204 that describes or otherwise indicates the signal power of downlink signals received via the switch matrix 306. For example, the receiver 204 may include one or more power measurement devices. The receiver 204 can use the power measurement device(s) to measure the signal power of received signals and provide data about the signal power to the processing device 212.

The BSSIM 216 can analyze the received signal power data to detect individual channels, bandwidths, and power of each frequency channel within a given frequency band. For example, the BSSIM 216 can search for frequency bands that include downlink signals having a signal power that exceeds a user-defined threshold. The BSSIM 216 can thereby determine a respective sub-band occupied by each downlink signal.

The BSSIM 216 can also determine which downlink signals are in the same sub-band. The BSSIM 216 can also determine whether any signals are in the same band occupy the same sub-band. For example, FIG. 4 is a table depicting frequency bands and sub-bands for signals that may be received by different input ports of the unit 102. Signals in sub-bands 301a-d of the frequency band 201 can be received via input ports 1-6, signals in sub-bands 302a-c of the frequency band 202 can be received via input ports 7-9, and signals in sub-bands 303a, 303b of the frequency band 203 can be received via input ports 10-11.

In some aspects, signals with frequencies in different sub-bands may be received by multiple input ports. For example, signals in sub-band 301a, 301c, 301d, 302a-c, 303a, and 303b may be received via respective inputs 1 and 5-11. In additional or alternative aspects, signals with frequencies in the same sub-band may be received by multiple input ports. For example, signals received via the inputs 2-4 may have frequencies in the same sub-band 301b. In additional or alternative aspects, signals associated with different base station sectors that have frequencies in the same sub-band may be received by different input ports. For example, signals in frequency sub-band 301b associated with sectors 304a-c may be received via respective input ports 2-4.

Figure 5:
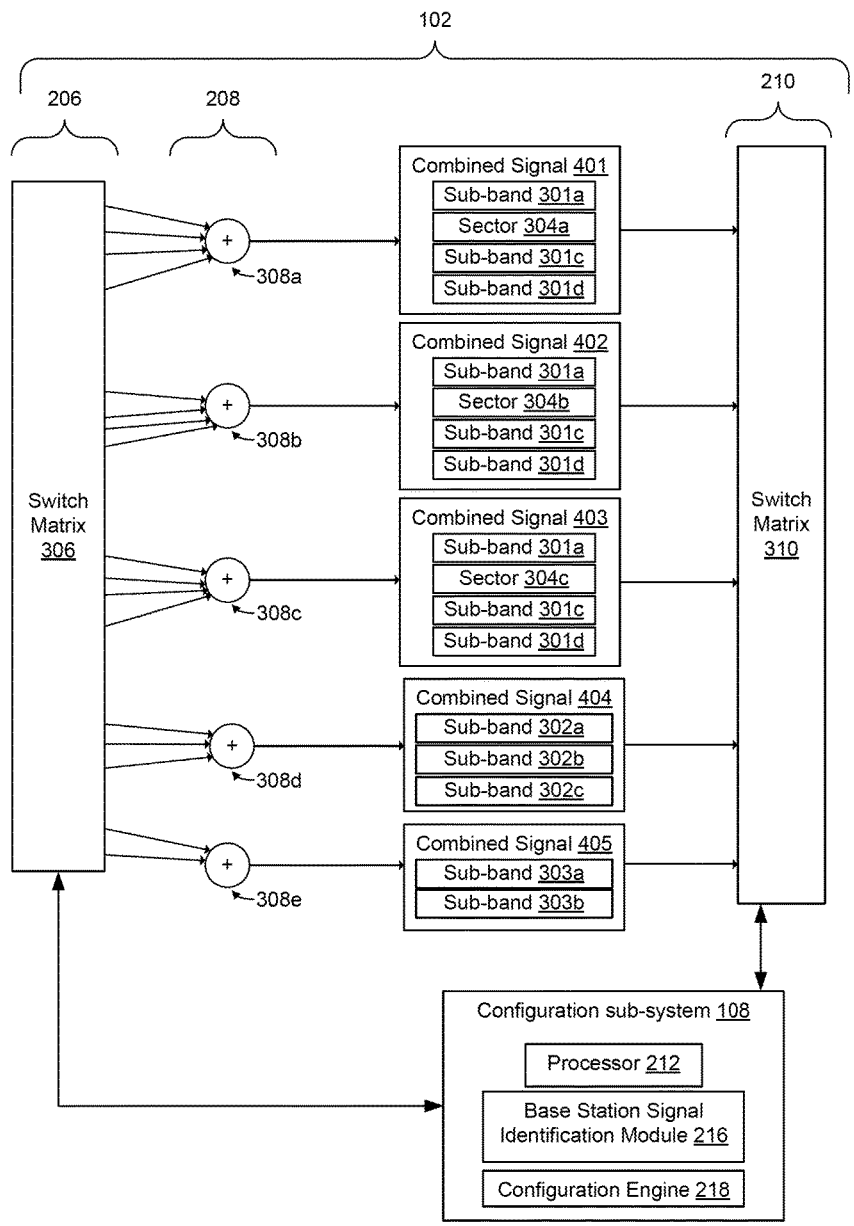
FIG. 5 is a block diagram depicting the unit of FIG. 3 using the configuration sub-system to combine the sub-bands into combined signals according to one aspect of the present disclosure.

FIG. 5 is a block diagram depicting the unit 102 combining sub-bands 301a-c, 302a-c, and 303a-b into combined signals 401-405 using the configuration sub-system 108.

The configuration sub-system 108 can be used to identify frequency bands that have no overlapping sub-bands and can therefore be combined and processed by common circuitry. For example, downlink signals received via the inputs 7-9 have frequencies that are in different sub-bands 302a-c of the frequency band 202 and therefore do not overlap. The configuration sub-system 108 can determine that the downlink signals received via the inputs 7-9 have frequencies in the non-overlapping sub-bands 302a-c. The configuration sub-system 108 can configure the switch matrix 306 to provide the downlink signals received via the inputs 7-9 to the adder 308d to generate a combined signal 404. In a similar manner, the configuration sub-system 108 can also determine that downlink signals received via the inputs 10-11 have frequencies that are in non-overlapping sub-bands 303a, 303b of the frequency band 203. The configuration sub-system 108 can configure the switch matrix 306 to provide the downlink signals received via the inputs 10-11 to the adder 308e to generate a combined signal 405.

The configuration sub-system 108 can also be used to identify frequency bands with different sectors in the same frequency sub-band. For example, the configuration sub-system 108 can determine that the downlink signals received via the inputs 1, 5, and 6 have frequencies in the respective, non-overlapping sub-bands 301a, 301c, 301d of the frequency band 201. The configuration sub-system 108 can also determine that downlink signals received via the inputs 2-4 associated with sectors 304a-c have frequencies in the same sub-band 301b of the frequency band 201. The configuration sub-system 108 can configure the switch matrix 306 to provide the downlink signals received via the inputs 1, 2, 5, and 6 to the adder 308a to generate a combined signal 401. As depicted in FIG. 5, the combined signal 401 includes downlink signals with frequencies in sub-bands 301a, 301c, 301d as well as downlink signals with frequencies in sub-band 301b that are associated with sector 304a. The configuration sub-system 108 can also configure the switch matrix 306 to provide the downlink signals received via the inputs 1, 3, 5, and 6 to the adder 308b and the downlink signals received via the inputs 1, 4, 5, and 6 to the adder 308c. Adders 308b, 308c can respectively output combined signals 402, 403. As depicted in FIG. 5, each of the combined signals 402, 403 includes downlink signals with frequencies in sub-bands 301a, 301c, 301d. The combined signal 402 also includes downlink signals with frequencies in sub-band 301b that are associated with sector 304b. The combined signal 403 also includes downlink signals with frequencies in sub-band 301b that are associated with sector 304c.

In some aspects, the combining section 208 can include multipliers or other gain adjustment devices that can scale the relative levels of downlink signals included in each of the combined signals 401-405. For example, multipliers or other gain adjustment devices can adjust the signal powers of downlink signals in different sub-bands the downlink signals are combined in one of the adders 308a-e. Scaling of signal levels can be defined by a user or automatically implemented according to pre-defined rules. In some aspects, the relative power level of the signals can be dependent on the number of channels in each sub-band. For example, sub-band 302a may have four channels, sub-band 302b may have six channels and sub-band 302c may have ten channels. The total power of all sub-bands may have a relative level of "1." The sub-band 302a can be scaled to have a relative power of "0.2," the sub-band 302b can be scaled to have a relative power of "0.3," and the sub-band 302c can be scaled to have a power of "0.5." In other aspects, relative signal levels can be determined based on the bandwidth of the sub-band. In other aspects, different downlink signal powers can be adjusted such that all downlink signals combined by one of the adders 308a-e have the same signal power.

Figure 6:
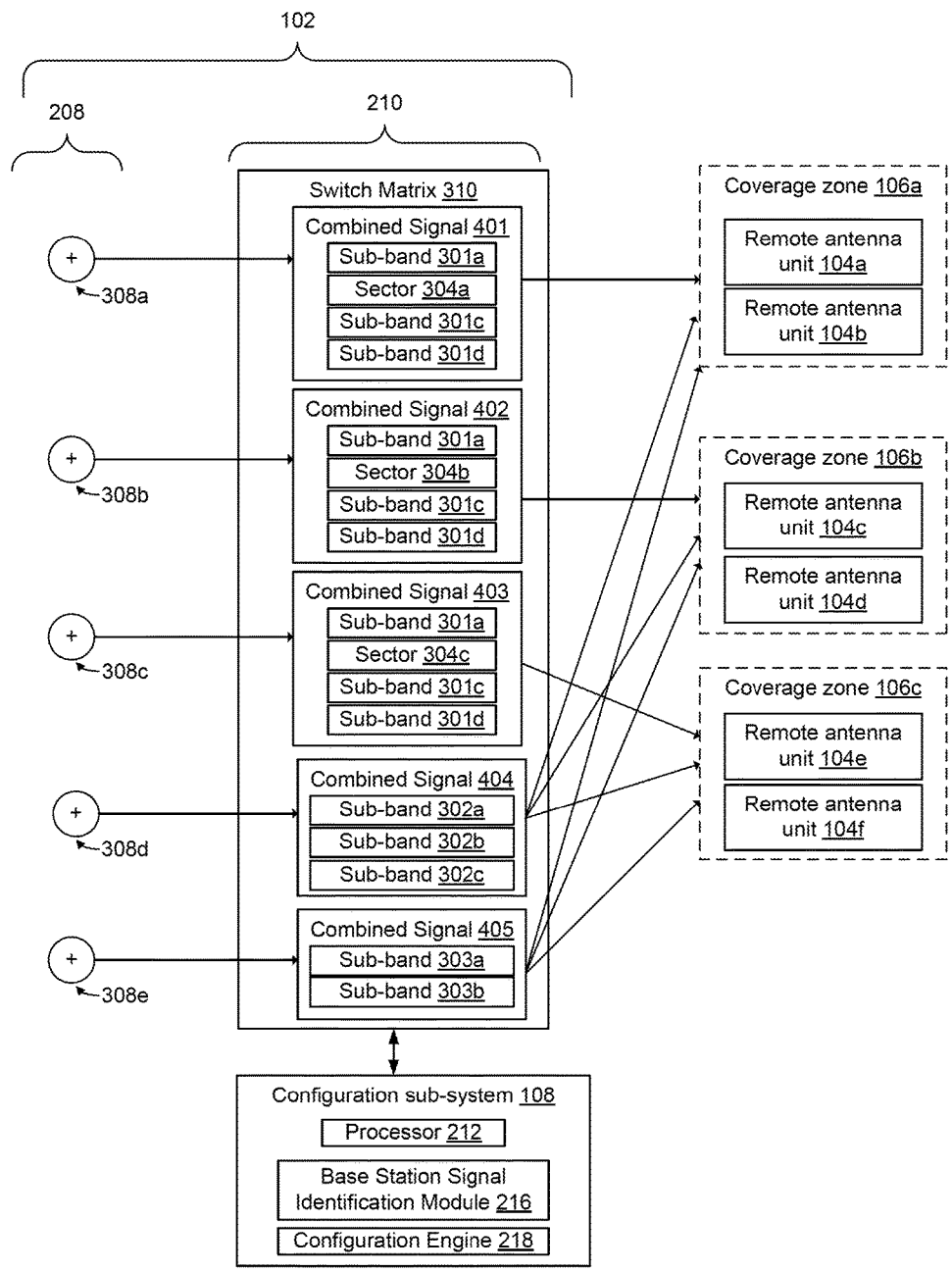
FIG. 6 is a block diagram depicting the unit of FIG. 3 using the configuration sub-system to provide the combined signals to the coverage zones serviced by the distributed antenna system according to one aspect of the present disclosure.

Each of the combined signals 401-405 can be transmitted by the remote antenna units in a given coverage area serviced by the DAS 100. For example, FIG. 6 is a block diagram depicting the unit 102 providing combined signals 401-405 generated using the configuration sub-system 108 to the coverage zones 106a-c. Different combined signals with frequencies in different frequency bands can be provided to the same remote antenna units for transmission in a given coverage area. For example, the unit 102 can provide the combined signals 401, 404, 405 (which collectively include downlink signals received via inputs 1, 2, and 5-11) to the remote antenna units 104a-f servicing the coverage zone 106a. The unit 102 can also provide the combined signals 402, 404, 405 (which collectively include downlink signals received via inputs 1, 3, and 5-11) to the remote antenna units 104c, 104d servicing the coverage zone 106b. The unit 102 can also provide the combined signals 403-405 (which collectively include downlink signals received via inputs 1, 4, and 5-11) to the remote antenna units 104e, 104f servicing the coverage zone 106c.

Different downlink signals having frequencies in a common sub-band can be transmitted by a non-intersecting subset of remote antenna units 104a-f of a portion of a coverage area serviced by the DAS 100. For example, a coverage area serviced by the DAS 100 can include portions such as coverage zones 106a-c. Each of the coverage zones 106a-c can be serviced by a subset of the remote antenna units 104a-f that does not transmit signals to other coverage zones (i.e., do not intersect the other coverage zones). For example, as depicted in FIG. 6, the remote antenna units 104a, 104b service the coverage zone 106a, but do not transmit signals that can be received by communication devices in coverage zones 106b, 106c. The configuration sub-system 108 can determine that combined signals 401-403 each include downlink signals that are associated with different base station sectors 304a-c and that have frequencies in a common sub-band 301b. The configuration sub-system 108 can configure the switch matrix 310 to route each of the signals 401-403 to a different non-intersecting subset of remote antenna units 104a-f (i.e., to a different one of the coverage zones 106a-c).

In additional or alternative aspects, multiple remote antenna units may service the same coverage zone. Downlink signals in the overlapping sub-bands can be transmitted to a subset of the remote antenna units 104a-f of for a portion of the coverage zone. For example, downlink signals in overlapping sub-bands can be transmitted to approximately (1/number of overlapping sub-bands) of the remote antenna units 104a-f.

The BSSIM 216 can use any suitable process or set of processes for determining the relevant characteristics of the received downlink signals. For example, the frequency bands for downlink signals can include frequency bands used for telecommunication networks such as (but not limited to) UMTS systems, Personal Communications Service ("PCS") systems, Advanced Wireless Services ("AWS") systems, Advanced Mobile Phone System ("AMPS") systems, etc. The BSSIM 216 can determine the frequency bands used by downlink signal in any suitable manner. For example, the receiver bandwidth (e.g. 75 MHz) for the receiver 204 may be less that the total range of signal frequencies that can be processed by the DAS 100 (e.g. 400 MHz-2.7 GHz+). The configuration engine 218 can generate a control signal that is used by the processing device 212 to tune the receiver 204 to each band of interest. For each band of interest, the BSSIM 216 can determine the power in the received band via any suitable method, such as a fast Fourier transform ("FFT"), sum of squares, etc. The BSSIM 216 can determine that power in a given frequency band is greater than a programmable threshold. The BSSIM 216 can determine that downlink signals are transmitted in the frequency band based on the power exceeding the threshold.

For example, to identify signals in the AMPS band, the configuration sub-system 108 can tune the receiver 204 of the unit 102 to receive the frequencies included in the AMPS band. The BSSIM 216 can apply a filter to signals received by the receiver 204 to select signals in the AMPS band. The BSSIM 216 can measure the power in the AMPS band. The BSSIM 216 can respond to power being detected by performing a channel search function. The configuration engine 218 can respond to the absence of detected power by configuring a control device to tune the receiver 204 to another band, such as the PCS band. The configuration sub-system 108 can repeat this process for all defined bands to detect signals that are being transmitted at frequencies in any of the bands of operation. The BSSIM 216 can process the signals after identifying the frequencies of operation. The power within a frequency band can be measured at multiple frequencies in the band. For example, the power may be measured with an FFT. The BSSIM 216 can determine which portions of the band have signals greater than a programmable threshold based on the power measurements at multiple frequencies in the band.

The BSSIM 216 can also determine the center frequency of all channels contained within these sub-bands. The BSSIM 216 can access a list of possible channel bandwidths, channel frequencies, and modulation types for each band, and/or sub-bands. The BSSIM 216 can perform a search of possible channel frequencies and modulation types by applying demodulation algorithms that are capable of operating on the types of signals communicated via the DAS 100.

The configuration engine 218 can decode each signal according to the detected signal characteristics. The configuration engine 218 can extract information for identifying an operator such as (but not limited to) a mobile country code ("MCC"), a mobile network code ("MNC"), a base station identifier, geographic coordinates obtained from a GPS device, etc. This data can be used to determine a geographic region of a country in which the DAS 100 is located. The configuration sub-system 108 can access a database or other data file to determine which operators are licensed to operate in different bands in the geographic region. For example, many countries assign licenses to specific operators to operate within a certain set of frequencies and assign certain frequency bands for specific uses. The country code decoded from one of the signals during a search process can be used by the configuration engine 218 to limit the number of additional bands and modulation types that are scanned during the search process.

Although FIGS. 2-3 and 5-6 depict the unit 102 combining signals having frequencies in non-overlapping sub-bands of the same frequency band, other implementations are possible. In some aspects, one or more of the remote antenna units 104a-f can combine signals from different sub-bands. In other aspects, a combination of the unit 102 and one or more of the remote antenna units 104a-f can combine signals from different sub-bands. In other aspects, some other device of the DAS 100 can combine signals from different sub-bands.

Figure 7:
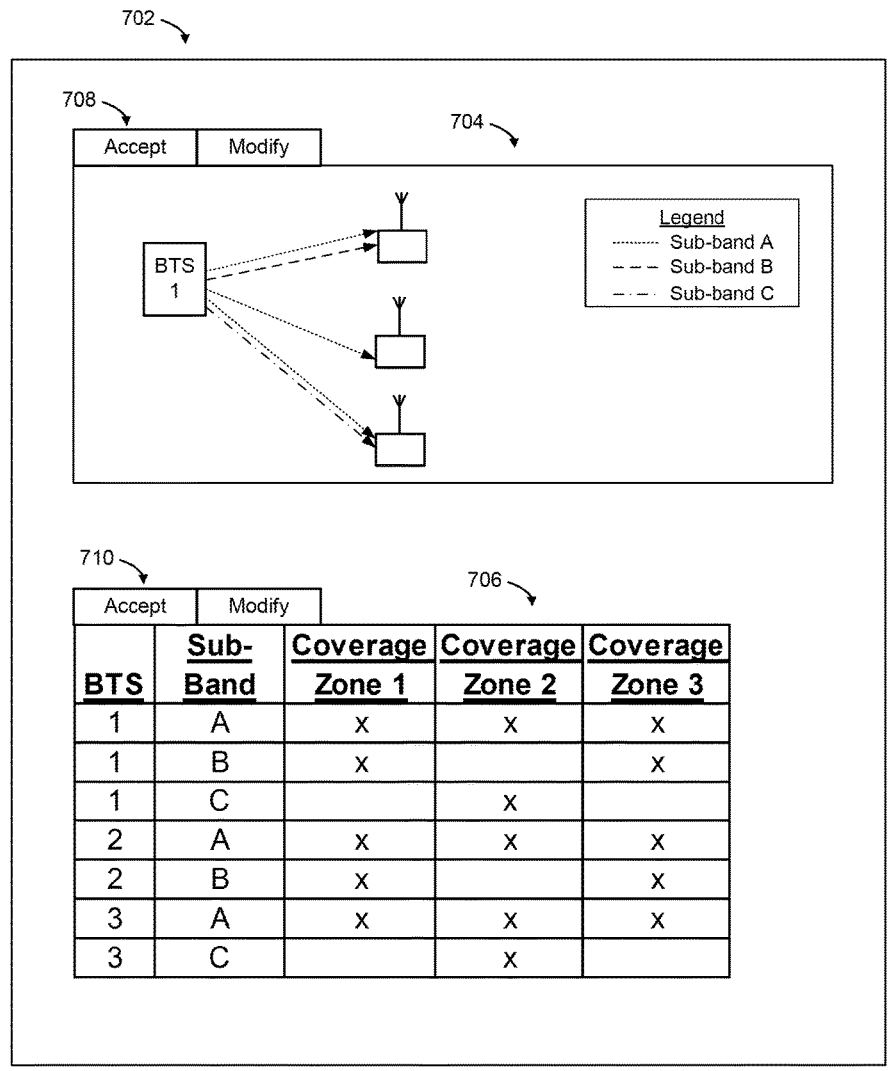
FIG. 7 is a diagram depicting an example of a graphical interface provided by the configuration sub-system for configuring a distributed antenna system according to one aspect of the present disclosure.

FIG. 7 is a diagram depicting an example of a graphical interface 702 that can be provided by the configuration sub-system 108 for configuring the DAS 100. The graphical interface depicted in FIG. 7 includes a section 704 for displaying some or all aspects of a configuration plan in a graphical format. For example, section 704 graphically depicts the assignment of different sub-bands to different coverage zones with respect to one of the base stations connected to the DAS 100. The graphical interface depicted in FIG. 7 also includes a section 706 for displaying some or all aspects of a configuration plan in a tabular format. For example, section 706 includes a table identifying the assignment of sub-bands to coverage zones of the DAS 100 with respect to each of the base stations connected to the DAS 100. Each of the sections 704, 706 can include respective controls 708, 710 allowing a user to accept the configuration plan provided by the configuration sub-system 108 or modify the configuration plan.

In some aspects, the graphical interface 702 can be presented in a "wizard" or other configuration application executed at a computing device 220. The configuration application can provide a step-by-step process that allows a user to configure a DAS. For example, the graphical interface 702 can present a proposed configuration plan with respect to each base station in section 704. A user can select "Modify" to manually change the routing of sub-bands to coverage zones. Once the configuration plan is acceptable to the user, the user may click "Accept" to verify the configuration plan with respect to the displayed base station. The table in section 706 can be updated to include accepted configuration plan for the displayed base station. The configuration application can repeat this process for each base station connected to the DAS 100.

In additional or alternative aspects, some or all of the graphical interface 702 can be presented as a notification to a user in response to detecting a change in the DAS 100. For example, a user may be notified that a change in the signals receive by the DAS 100 has been detected or that some other aspect of the DAS configuration has been changed. The notification can be provided to the computing device 220.

Although FIG. 7 depicts an example of a graphical interface 702 that includes sections 704, 706 and controls 708, 710, any suitable graphical interface can be generated by the configuration sub-system 108 to assist in the configuration of the DAS 100. A suitable graphical interface can present a configuration plan in any suitable format, such as the tabular and graphical formats depicted in FIG. 7 as well as any other suitable format. A suitable graphical interface can also include any controls suitable for viewing, modifying, verifying, or otherwise using the configuration plan.

In additional or alternative aspects, the configuration engine 218 can determine the routing of MIMO signals from one or more base stations to one or more of the remote antenna units 104a-f. For MIMO signals, multiple signals may be purposely transmitted on the same frequency and are to be transmitted in the same coverage area. For example, multiple antennas at the same radiating point or multiple antennas located close together can transmit the signals so that a mobile communication device or other user equipment can receive the multiple signals. For potential MIMO-capable signals that are operating at the same frequency, the configuration engine 218 can either directly decode or jointly decode the signals to determine which input signals are included in a MIMO set. Potential MIMO-capable signals can include signals having a modulation type that permits MIMO operation (e.g. LTE or High-Speed Downlink Packet Access ("HSDPA")). The configuration engine 218 can distinguish MIMO downlink signal sets occupying the same spectrum from non-MIMO downlink signals occupying the same spectrum. The configuration engine 218 can determine that MIMO signals are to be transmitted to a common remote antenna unit or to a set of remote antenna units configured for MIMO operation in a given one of the coverage zones 106a-c. The configuration engine 218 can also determine that non-MIMO downlink signals occupying the same spectrum are to be transmitted to different remote antenna units or sets of remote antenna units servicing different coverage zones.

In additional or alternative aspects, the configuration sub-system 108 can manage the distribution of capacity for coverage zones serviced by a DAS 100. The configuration sub-system 108 can determine the coverage zones that can be serviced by remote antenna units and other distribution units (e.g., master units and extension units) in the DAS 100. The configuration sub-system 108 can determine the capacity provided from the base station(s) in communication with the DAS 100. The configuration sub-system 108 can execute one or more preselected algorithms to distribute the capacity provided by the base stations to the coverage zones. The algorithms can assign capacity based on criteria such as maximizing capacity density, minimizing hand-over probability, delivering capacity density where it is needed based on traffic measurement in coverage zones or from externally supplied traffic measurement results. In some aspects, the configuration sub-system 108 can execute a capacity distribution service algorithm in the background during operation of the DAS 100 to monitor for events triggering a change in capacity distribution. The configuration sub-system 108 can execute the capacity distribution algorithm in response to changes in capacity available from base stations, the coverage zones to be serviced by the DAS 100, the detected or measured traffic distribution, etc. The configuration sub-system 108 can assign available capacity to coverage zones using regional default settings, such as frequency bands specified for use in a given country or other geographic region. In some aspects, a graphical interface for distributing capacity can be provided to a user. The user can provide inputs to the configuration sub-system 108 via, for example, a "wizard" interface based on recommendations generated by the configuration sub-system. The configuration sub-system 108 can distribute capacity based on inputs received from a user.

The foregoing description of aspects and features of the disclosure, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure. Aspects and features from each example disclosed can be combined with any other example. The illustrative examples described above are given to introduce the reader to the general subject matter discussed here and are not intended to limit the scope of the disclosed concepts.

What is claimed is:

1. A unit of a distributed antenna system, the unit comprising:
an input section configured to receive a plurality of downlink signals from at least one base station;
a processing device communicatively coupled to the input section and configured to:
identify a plurality of signal parameters for the plurality of downlink signals, and
automatically determine a configuration plan for the distributed antenna system based on the plurality of signal parameters, wherein the configuration plan specifies different combinations of subsets of the plurality of downlink signals for routing to a plurality of remote antenna units of the distributed antenna system;
wherein the processing device is configured to identify the plurality of signal parameters for the plurality of downlink signals by:
for each frequency band used by the distributed antenna system: configuring a receiver of the unit to receive respective signals in the frequency band, and determining whether a respective power level for the respective signals in the frequency band exceeds a threshold;

identifying at least one frequency band having a power level exceeding the threshold, determining a signal power distribution among frequencies in the at least one frequency band, and determining the plurality of signal parameters based on the signal power distribution.

2. The unit of claim 1, wherein the plurality of signal parameters comprises at least one of:

a respective power spectral density for each frequency band used by the distributed antenna system, a respective lowest frequency for each frequency band used by the distributed antenna system, a respective highest frequency for each frequency band used by the distributed antenna system, a center frequency of all frequency channels used by the distributed antenna system, a bandwidth of all frequency channels used by the distributed antenna system, and a respective modulation type for each of the plurality of downlink signals.

3. The unit of claim 1, wherein the processing device is configured to automatically determine the configuration plan for the distributed antenna system by:

determining that the plurality of downlink signals includes a plurality of sectors from a common base station;

assigning a first sector of the plurality of sectors to a first subset of the plurality of remote antenna units configured to service a first coverage zone; and assigning a second sector of the plurality of sectors to a second subset of the plurality of remote antenna units configured to service a second coverage zone, wherein the second sector is assigned to the second subset of remote antenna units based on an absence of overlap between the first and second coverage zones.

4. The unit of claim 1, wherein the processing device is configured to automatically determine the configuration plan for the distributed antenna system by:

determining that the plurality of downlink signals includes a first subset of downlink signals in a first frequency sub-band and a second subset of downlink signals in a second frequency sub-band at least partially overlapping the first frequency sub-band;

assigning the first subset of downlink signals to a first subset of the plurality of remote antenna units servicing a first coverage zone; and assigning the second subset of downlink signals to a second subset of the plurality of remote antenna units servicing a second coverage zone, wherein the first subset and the second subsets are assigned to the respective first and second coverage zones based on the second frequency sub-band at least partially overlapping the first frequency sub-band.

5. The unit of claim 1, wherein the processing device is configured to automatically determine the configuration plan for the distributed antenna system by:

determining that the plurality of downlink signals includes at least one subset of signals comprising multiple-input-multiple output signals; and assigning the at least one subset of signals to a subset of the plurality of remote antenna units servicing a common coverage zone and communicate multiple-input-multiple output signals.

6. The unit of claim 1, wherein the processing device is further configured to:

identify at least one routing conflict with respect to a subset of the plurality of remote antenna units and a subset of the plurality of downlink signals;

determine at least one configuration change for resolving the at least one routing conflict; and output the at least one configuration change with the configuration plan.

7. The unit of claim 1, wherein the processing device is further configured to identify the plurality of signal parameters and automatically determine the configuration plan in response to a change with respect to the at least one base station or the plurality of remote antenna units in communication with the unit.

8. The unit of claim 1, further comprising a combining section configured to combine subsets of the plurality of downlink signals into combined downlink signals, wherein the processing device is further configured to output a control signal causing the combining section to combine the subsets of downlink signals based on the configuration plan.

9. The unit of claim 8, further comprising an output section configured to route the combined downlink signals to the plurality of remote antenna units, wherein the processing device is communicatively coupled to the output section and is further configured to output an additional control signal causing the output section to route the combined downlink signals based on the configuration plan.

10. The unit of claim 1, wherein the processing device is further configured to receive information about at least one of the plurality of signal parameters via the input section.

11. The unit of claim 1, further comprising a data interface device configured to communicate with the at least one base station, wherein the processing device is further configured to receive information about at least one of the plurality of signal parameters via the data interface device.

* * * * *